(12) United States Patent
Karuturi

(10) Patent No.: US 7,882,295 B2
(45) Date of Patent: Feb. 1, 2011

(54) NON-SYSTEM BUS WIDTH DATA TRANSFER EXECUTABLE AT A NON-ALIGNED SYSTEM BUS ADDRESS

(75) Inventor: Brahmanandam Karuturi, Andhra Pradesh (IN)

(73) Assignee: NVIDIA Corporation, Santa Clara, CA (US)

(*) Notice: Subject to any disclaimer, the term of this patent is extended or adjusted under 35 U.S.C. 154(b) by 218 days.

(21) Appl. No.: 12/334,859

(22) Filed: Dec. 15, 2008

(65) Prior Publication Data

US 2010/0153609 A1 Jun. 17, 2010

(51) Int. Cl.
*G06F 13/40* (2006.01)

(52) U.S. Cl. .................. 710/307; 710/310; 711/219

(58) Field of Classification Search ......... 710/305–308, 710/310, 52–57; 711/65–66, 200–202, 219, 711/109–110
See application file for complete search history.

(56) References Cited

U.S. PATENT DOCUMENTS

| | | | | |
|---|---|---|---|---|
| 5,517,627 A | * | 5/1996 | Petersen | 710/316 |
| 5,687,328 A | * | 11/1997 | Lee | 710/307 |
| 5,859,990 A | * | 1/1999 | Yarch | 710/33 |
| 6,185,633 B1 | * | 2/2001 | Johnson | 710/22 |
| 6,442,646 B1 | * | 8/2002 | Tsuruta | 711/109 |
| 6,622,232 B2 | * | 9/2003 | Schroeder | 711/219 |
| 6,813,734 B1 | * | 11/2004 | Bhardwaj | 714/48 |

\* cited by examiner

*Primary Examiner*—Raymond N Phan
(74) *Attorney, Agent, or Firm*—Raj Abhyanker, P.C.

(57) ABSTRACT

Disclosed are a method and apparatus of non-system bus width data transfer executable at a non-aligned system bus address. In one embodiment, a method of a controller is described. The method includes applying a FIFO buffer having a buffer width (e.g., determined using a transfer algorithm) that is wider than that of a system bus width. A system bus that permits transfer of data amounts which are non-integer multiples of a width of the system bus is used. The system bus is designed such that it supports any non-aligned system bus address. Data is transferred between devices coupled to the system bus.

20 Claims, 6 Drawing Sheets

| FIFO SLOT/ BYTES 202 | EXTRA BITS 204 | BYTE N 206N | ... | BYTE 1 206B | BYTE 0 206A |
|---|---|---|---|---|---|
| 0 | | | | | |
| 1 | | | | | |
| 2 | | | | | |
| ⋮ | ⋮ | ⋮ | ⋮ | ⋮ | ⋮ |
| M | | | | | |

FIGURE 2

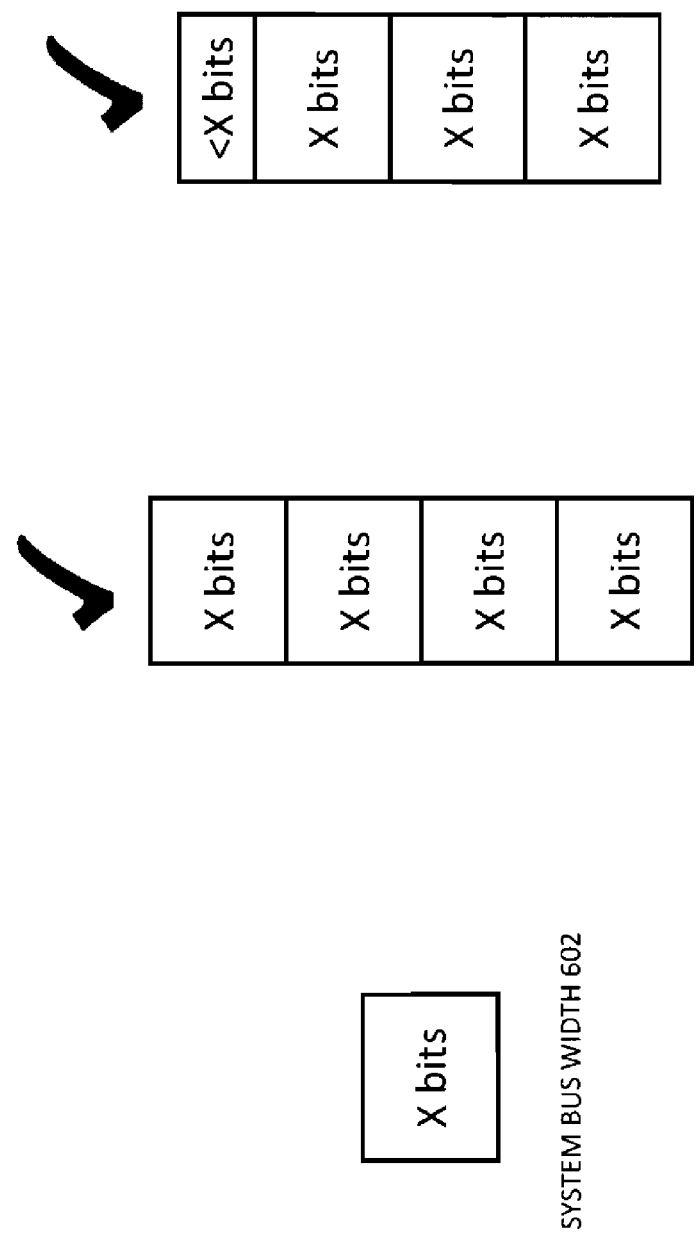

NON-SYSTEM BUS WIDTH DATA TRANSFER EXECUTABLE AT A NON-ALIGNED SYSTEM BUS ADDRESS

FIELD OF TECHNOLOGY

This disclosure generally relates to a communication method and apparatus involving a non-system bus width data transfer executable at a non-aligned system bus address.

BACKGROUND

A system bus may permit transfer of data across the system bus so long as the data being transferred is an integer multiple of a width of the system bus. For example, if the system bus is 32 bits wide, data being transferred across the system bus may need to be 32 bits wide, 64 bits wide, 96 bits wide, etc. (or 1× the system bus width, 2× the system bus width, 3× the system bus width). If data is not an integral multiple of the system bus width, additional bits may need to be added to the data prior to communication across the system bus so that the transfer is an integer multiple of the system bus width.

This may increase the amount of time required to transfer the data across the system bus. Furthermore, additional processing power may be required to add bits to the data, and to remove the bits when data is transferred across the system bus. Even when the data is transferred across the system bus, a controller may not be able to access the data at a non-aligned system bus address.

SUMMARY

Disclosed are a method and apparatus of non-system bus width data transfer executable at a non-aligned system bus address. In one aspect, a method of a controller is described. The method includes applying a First In First Out (FIFO) buffer having a buffer width (e.g., determined using a transfer algorithm) that is wider than that of a system bus width. A system bus that permits transfer of data amounts which are non-integer multiples of a width of the system bus is used in the method. The system bus is designed such that it supports any non-aligned system bus address. The system bus may be a high speed Advanced Microcontroller Bus Architecture (AMBA) bus. Data is transferred between devices coupled to the system bus.

In another aspect, an integrated circuit is described. The integrated circuit includes a controller to manage a data transfer. A FIFO buffer of the integrated circuit has a buffer width wider than a system bus width. A system bus of the integrated circuit permits transfer of data amounts which are non-integer multiples of a width of the system bus. In addition, the integrated circuit includes a data alignment module to read and write data which starts at a non-aligned address location of a memory device.

In both the method and integrated circuit, a transfer algorithm may calculate the buffer width of the FIFO buffer. One specific transfer algorithm may ceil a logarithmic to base two of a quotient of a division comprising a dividend as the system bus width and a divisor as eight, and summing the ceiled value to the system bus width. The method and integrated circuit may include arranging the data in a byte format in the FIFO buffer. The method and integrated circuit may also include fetching a data byte into a lower byte position of the FIFO buffer from a lower memory address of a memory device than that of the data byte in higher memory address. In addition, the method and integrated circuit may include storing the data byte in the lower byte position to the lower memory address of the memory device than that of the data byte in higher byte position in the FIFO buffer. The buffer width of the FIFO buffer in the method and in the integrated circuit may include an extra bit. The extra bit may enable tracking the number of bytes in every entry to the FIFO buffer.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 2 is a table view illustrating the representation of the FIFO buffer 100 that has an extra bit for tracking the number of bytes in every entry to the FIFO buffer 100.

FIG. 6 is an illustrative diagram of data amounts which are non-integer multiples of the system bus width, according to one embodiment.

Other features of the present embodiments will be apparent from the accompanying drawings and from the detailed description that follows.

DETAILED DESCRIPTION

Disclosed are a method and apparatus of non-system bus width data transfer executable at a non-aligned system bus address. Although the present embodiments have been described with reference to specific example embodiments, it will be evident that various modifications and changes may be made to these embodiments without departing from the broader spirit and scope of the various embodiments.

Figure 1:
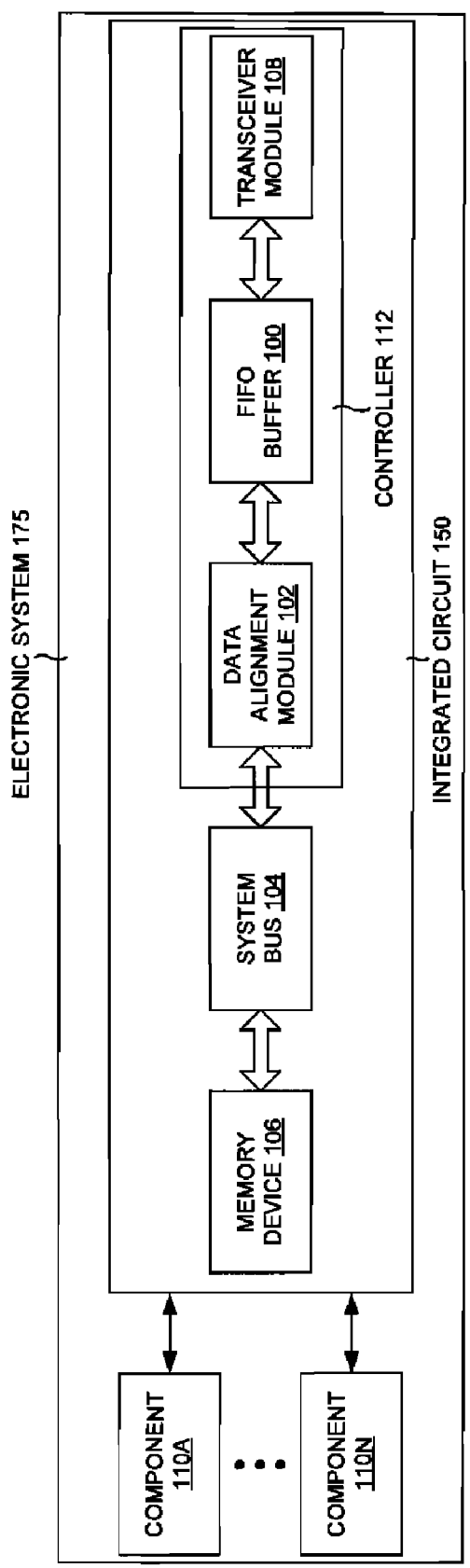
FIG. 1 is a system view illustrating an electronic system that includes a controller 112 in an integrated circuit 150, according to one embodiment.

In one embodiment, a method of a controller is described (e.g., the controller 112 of FIG. 1). The method includes applying a FIFO buffer (e.g., the FIFO buffer 100 of FIG. 1) having a buffer width (e.g., determined using a transfer algorithm) that is wider than that of a system bus width. A system bus that permits transfer of data amounts which are non-integer multiples of a width of the system bus is used in the method. The system bus is designed such that it supports any non-aligned system bus address. Data is transferred between devices coupled to the system bus.

In another embodiment, an integrated circuit is described (e.g., an integrated circuit 150 of FIG. 1). The integrated circuit includes a controller to manage a data transfer. A FIFO buffer of the integrated circuit has a buffer width wider than a system bus width. A system bus of the integrated circuit permits transfer of data amounts which are non-integer multiples of a width of the system bus. In addition, the integrated circuit includes a data alignment module to read and write data which starts at a non-aligned address location of a memory device.

FIG. 1 is a system view illustrating an electronic system that includes a controller 112 in an integrated circuit 150, according to one embodiment. In particular, FIG. 1 illustrates a FIFO buffer 100, a data alignment module 102, a system bus 104, a memory device 106, a transceiver module 108, and components 110A-N, according to one embodiment.

The FIFO buffer 100 may be memory buffer where the first byte to arrive is the first byte to leave. The data alignment module 102 may read and/or write data which starts at a non-aligned address location of the memory device 106. The system bus 104 may be a medium for communicating data and control signals between the main components 110A-N. The memory device 106 (e.g., RAM, EEPROM, etc.) may be a device that preserves information for retrieval. The transceiver module 108 may handle the data arrangement of the FIFO buffer 100. The transceiver module 108 may communicate with the external component 110A-N. The components 110A-N may be external devices that provide input and/or driven by the integrated circuit 150.

In an example embodiment, FIG. 1 illustrates an electronic system. The electronic system may include the components 110A-N and the integrated circuit 150 communicating with each other. The integrated circuit 150 may include the memory device 106, the system bus 104 and the controller 112. The controller 112 may include the FIFO buffer 100, the data alignment module 102 and the transceiver module 108. The data alignment module 102 may handle the data with respect to the system bus 104. The transceiver module 108 may transfer the data while there is a data transfer of data to the components (e.g., component 110A-N). The transceiver module 108 may fill the FIFO buffer 100 with data that is a multiple of the system bus 104 width when receiving data from outside components 110A-N.

If the data transfer is not the system bus width aligned, then the last insertion (e.g., push) to the FIFO buffer 100 may include the remaining bytes of data. The data transfer may be determined by the transfer algorithm that calculates the buffer width of the FIFO buffer 100 by using an equation:

$$A + \text{ceil}(\log_2(A/8)) = 32 + 2 = 34 \text{ bits; Where 'A' is a system bus width.}$$

The byte arrangement may be in such a way that they occupy a lower byte position and move on to an upper byte position. The bytes in the lower byte position may be the first arrived while a pushing operation (e.g., inserting data) to the FIFO buffer 100 is used. The bytes in the lower byte position may be the first to be sent out to the system bus 104 when a pop operation is performed. In other words the bytes in the lower position are either fetched or stored from/to lower memory address than that of the bytes in higher byte position. With this approach, the support for data transfers that are not word aligned and that don't start at non-word aligned address may be handled.

In one embodiment, the FIFO buffer 100 having a buffer width be applied that is wider than that of a system bus width. The buffer width may be determined based on a transfer algorithm. A data may be transferred between devices coupled to the system bus 104. The system bus may permit data amounts that are non-integral multiple of the system bus width. The data may be transferred between devices of the system bus 104. The system bus may support any non-aligned system bus address. The transfer algorithm may calculate the buffer width of the FIFO buffer 100 by ceiling a logarithmic to base two of a quotient of a division comprising a dividend as the system bus width and a divisor as eight and summing the ceiled value to the system bus width. The FIFO buffer 100 may be a data buffer that prevents a loss of the data during a high-speed communication. The data may be arranged in a byte format in the FIFO buffer 100. A data byte may be fetched into a lower byte position of the FIFO buffer 100 from a lower memory address of the memory device 106 than that of the data byte in higher memory address.

The data byte may be stored in the lower byte position to the lower memory address of the memory device 106 than that of the data byte in higher byte position in the FIFO buffer 100. The buffer width of the FIFO buffer 100 may include an extra bit. The extra bit may enable in tracking the number of bytes in every entry to the FIFO buffer 100. The system bus 104 may be a medium for communicating the data between the devices that are coupled to this bus. The system bus width may indicate the maximum number of bits transmittable in a cycle. The system bus 104 may be a high speed AMBA bus. A system bus address may specify a physical location of the memory device 106 from which the controller 112 accesses the data and communicates with an external component 110A-N. The non-aligned system bus address may be the physical location of the memory device 106 that is not integral multiple of the system bus width.

The controller 112 may manage a data transfer. The FIFO buffer 100 includes a buffer width wider than a system bus width. The system bus 104 may be coupled between the data alignment module 102 and the component 110A-N on the integrated circuit 150 to provide the data transfer that is a non-integral multiple of the system bus width and which begins communicating with a non-aligned system bus address. The data alignment module 102 may be coupled between the FIFO buffer 100 and the system bus 104 to read and write data which starts at a non-aligned address location of the memory device 106. The transceiver module 108 coupled between the FIFO buffer 100 and external component 110A-N.

The system bus 104 may be a medium for the data transfer between devices that are coupled to the system bus. The system bus width may indicate a maximum number of bits transmittable in a cycle. The system bus 104 may be a multiple of byte wide and may be capable of handling partial system bus byte request. The system bus 104 address may specify a physical location of the memory device 106 from which the controller 112 accesses data and communicates with the external component 110A-N. The non-aligned system bus address may be the physical location of the memory device 106 that is not the integral multiple of the system bus width.

The FIFO buffer 100 may be a data buffer that prevents a data loss during a high-speed communication. The data alignment module 102 may drive the logic that initiates a data request on to the system bus in order to read and/or write the data starting with non-aligned address location of the memory device. The data alignment module 102 may also handle data arrangement of the FIFO buffer 100. Access to the data may be permitted in a byte format, a half-word format and/or a word format through the memory device 106. The transceiver module 108 may communicate to the external component 110A-N. The transceiver module 108 may be the device that has a transmitter and a receiver which share a common circuitry and/or a single housing. The transceiver module 108 may also handle the data arrangement of the FIFO buffer 100.

FIG. 2 is a table view illustrating the representation of the FIFO buffer 100 that has an extra bit for tracking the number of bytes in every entry to the FIFO buffer 100. Particularly, FIG. 2 illustrates a FIFO slot/bytes field 202, extra bits field 204, and byte 206A-N fields, according to one embodiment.

The FIFO slot/bytes field 202 may illustrate the memory locations in which the data may be stored. The term 'M' illustrates the depth of the FIFO buffer 100. The 'M' can be based on the performance requirements and design. The extra bits field 204 may enable the tracking the number of bytes in every entry to the FIFO buffer 100. The byte fields' 206A-N may illustrate the number of bytes in the system bus 104. The term 'N' illustrates the system bus 104 width.

Figure 3:
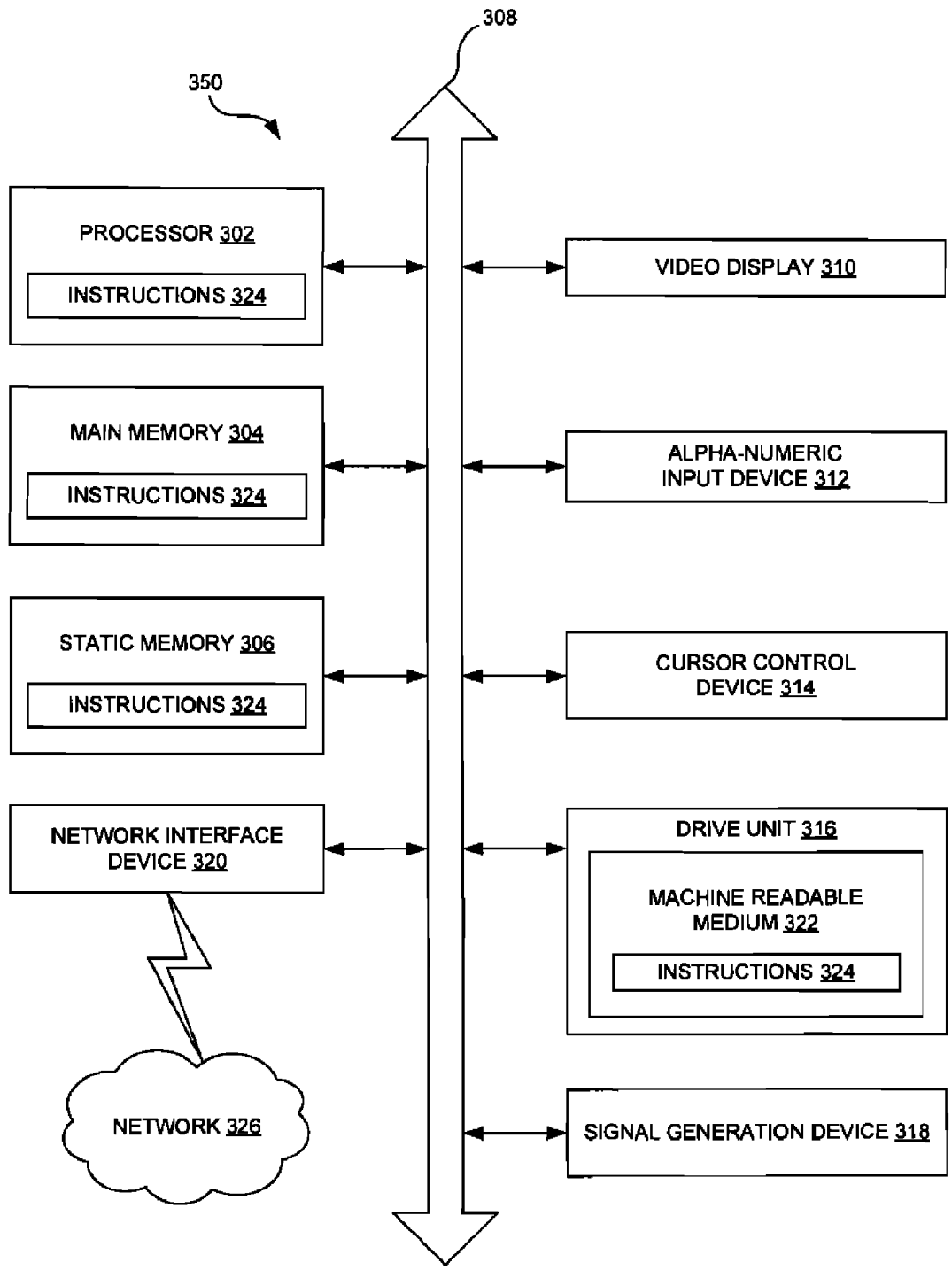
FIG. 3 is a diagrammatic system view of a data processing system in which any of the embodiments disclosed herein may be performed, according to one embodiment.

FIG. 3 is a diagrammatic system view of a data processing system in which any of the embodiments disclosed herein may be performed, according to one embodiment. Particularly, the diagrammatic system view 350 of FIG. 3 illustrates a processor 302, a main memory 304, a static memory 306, a bus 308, a video display 310, an alpha-numeric input device 312, a cursor control device 314, a drive unit 316, a signal generation device 318, a network interface device 320, a machine readable medium 322, instructions 324, and a network 326, according to one embodiment.

The diagrammatic system view 350 may indicate a personal computer and/or the data processing system in which one or more operations disclosed herein are performed. The processor 302 may be a microprocessor, a state machine, an application specific integrated circuit, a field programmable gate array, etc. The main memory 304 may be a dynamic random access memory and/or a primary memory of a computer system.

The static memory 306 may be a hard drive, a flash drive, and/or other memory information associated with the data processing system. The bus 308 may be an interconnection between various circuits and/or structures of the data processing system. The video display 310 may provide graphical representation of information on the data processing system. The alpha-numeric input device 312 may be a keypad, a keyboard and/or any other input device of text (e.g., a special device to aid the physically handicapped).

The cursor control device 314 may be a pointing device such as a mouse. The drive unit 316 may be the hard drive, a storage system, and/or other longer term storage subsystem. The signal generation device 318 may be a bios and/or a functional operating system of the data processing system. The network interface device 320 may be a device that performs interface functions such as code conversion, protocol conversion and/or buffering required for communication to and from the network 326. The machine readable medium 322 may provide instructions on which any of the methods disclosed herein may be performed. The instructions 324 may provide source code and/or data code to the processor 302 to enable any one or more operations disclosed herein.

Figure 4:
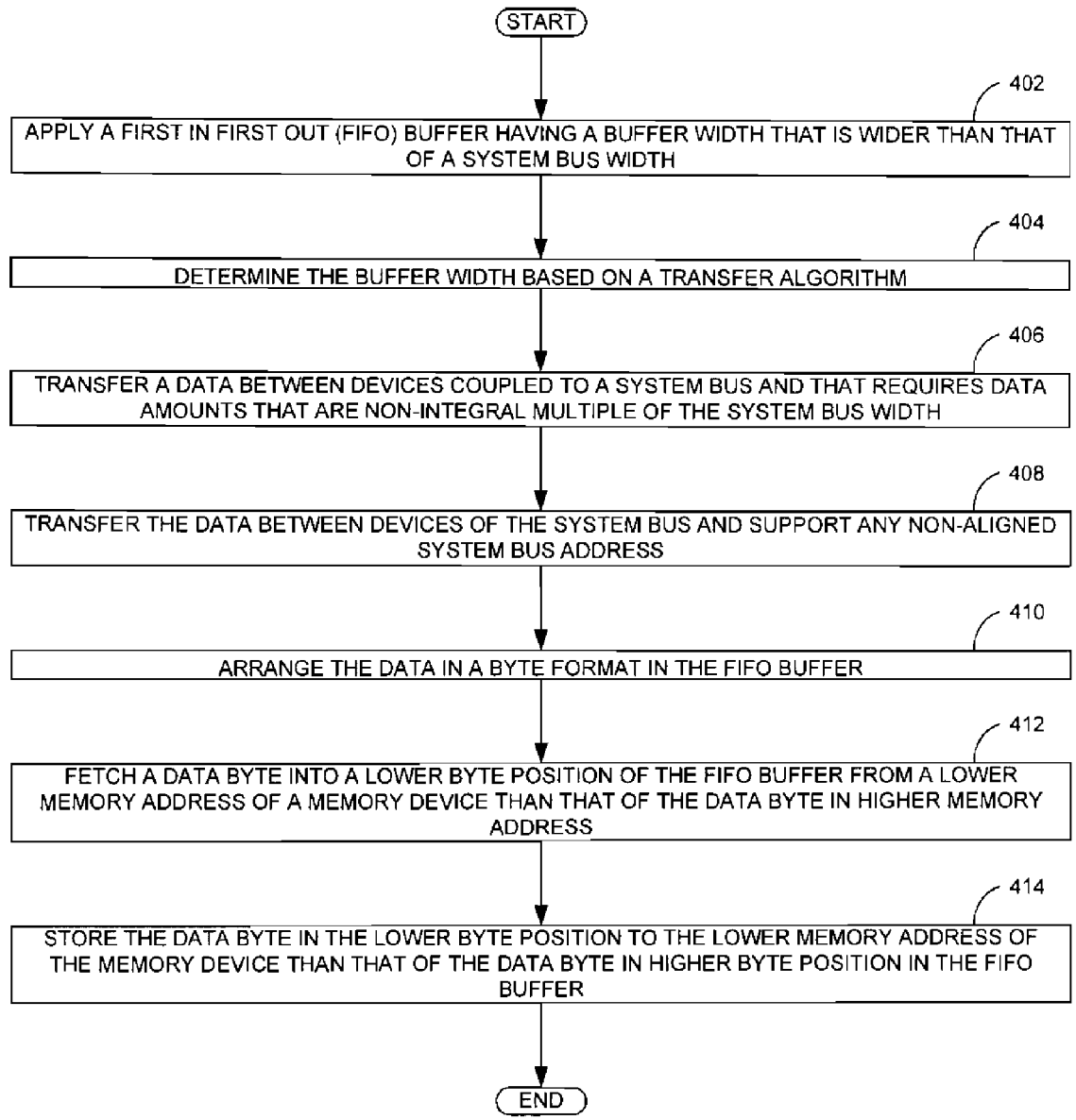
FIG. 4 is a process flow of applying a FIFO buffer having a buffer width that may be wider than that of a system bus width, according to one embodiment.

FIG. 4 is a process flow of applying a FIFO buffer having a buffer width that is wider than that of a system bus width, according to one embodiment. In operation 402, a FIFO buffer 100 may be applied having a buffer width that is wider than that of a system bus width. In operation 404, the buffer width may be determined based on a transfer algorithm. In operation 406, a data may be transferred between devices coupled to a system bus (e.g., the system bus 104 of FIG. 1) and that requires data amounts that are non-integral multiple of the system bus width. In operation 408, the data may be transferred between devices of the system bus 104 and support any non-aligned system bus address.

The transfer algorithm may calculate the buffer width of the FIFO buffer 100 by ceiling a logarithmic to base two of a quotient of a division comprising a dividend as the system bus width and a divisor as eight and summing the ceiled value to the system bus width. The FIFO buffer 100 may be a data buffer that prevents a loss of the data during a high-speed communication. In operation 410, the data may be arranged in a byte format in the FIFO buffer 100. In operation 412, a data byte may be fetched into a lower byte position of the FIFO buffer 100 from a lower memory address of a memory device (e.g., the memory device 106 of FIG. 1) than that of the data byte in higher memory address.

In operation 414, the data byte may be stored in the lower byte position to the lower memory address of the memory device 106 than that of the data byte in higher byte position in the FIFO buffer 100. The buffer width of the FIFO buffer 100 may include an extra bit. The extra bit may enable in tracking the number of bytes in every entry to the FIFO buffer 100. The system bus 104 may be a medium for communicating the data between the devices that are coupled to this bus. The system bus width may indicate the maximum number of bits transmittable in a cycle.

The system bus 104 may be a high speed AMBA bus. A system bus address may specify a physical location of the memory device 106 from which a controller (e.g., the controller 112 of FIG. 1) can access the data and/or communicates with an external component 110A-N. The non-aligned system bus address may be the physical location of the memory device 106 that is not integral multiple of the system bus width.

Figure 5:
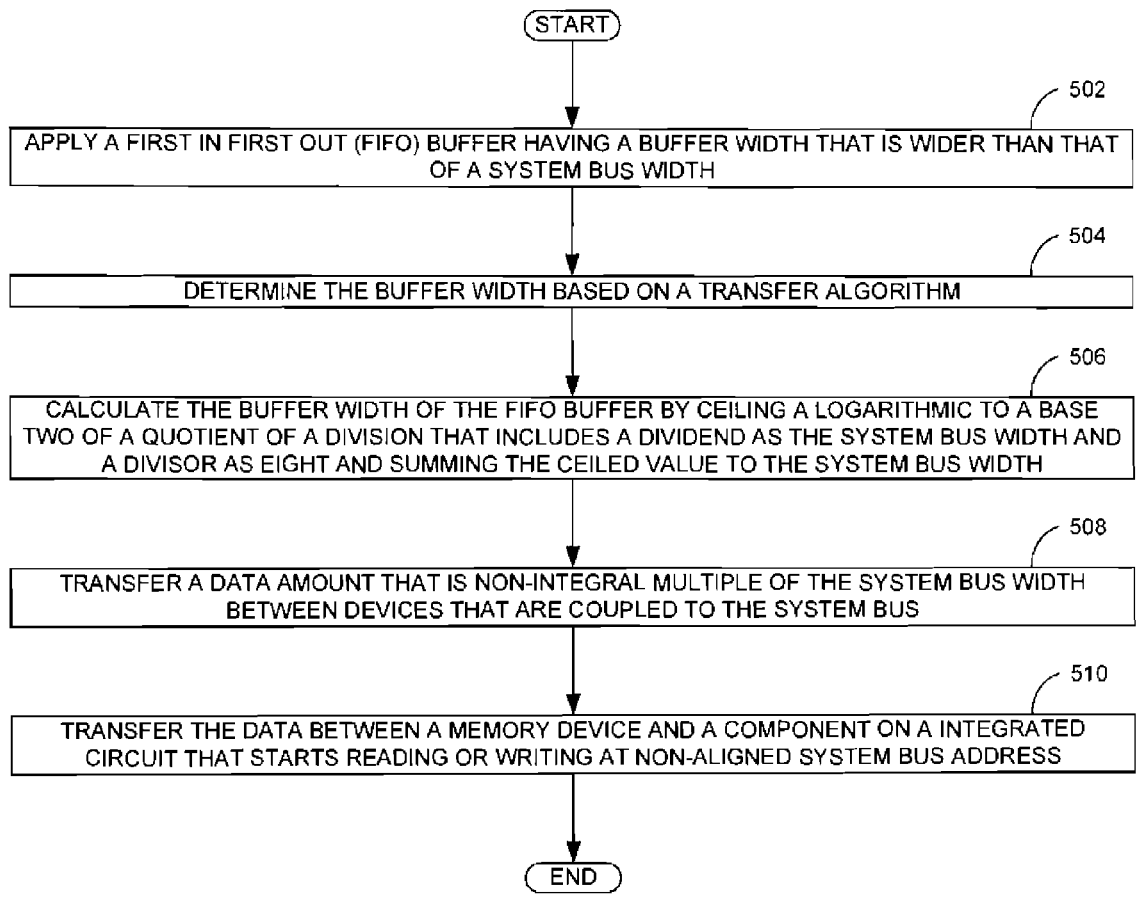
FIG. 5 is a process flow of transferring a data between a memory device and a component on an integrated circuit, according to one embodiment.

FIG. 5 is a process flow of transferring a data between a memory device and a component on an integrated circuit, according to one embodiment. In operation 502, a FIFO buffer (e.g., the FIFO buffer 100 of FIG. 1) may be applied having a buffer width that is wider than that of a system bus width. In operation 504, the buffer width may be determined based on a transfer algorithm. In operation 506, the buffer width of the FIFO buffer 100 may be calculated by ceiling a logarithmic to a base two of a quotient of a division comprising a dividend as the system bus width and a divisor as eight and summing the ceiled value to the system bus width. In operation 508, a data amount that is non-integral multiple of the system bus width may be transferred between devices that are coupled to the system bus 104. In operation 510, the data may be transferred between a memory device (e.g., the memory device 106 of FIG. 1) and a component 110A-N that starts reading or writing at non-aligned system bus address. The buffer width may include an extra bit (e.g., as illustrated in FIG. 2). The extra bit may enable in tracking the number of bytes in every entry to the FIFO buffer 100.

FIG. 6 is an illustrative diagram of data amounts which are non-integer multiples of the system bus width, according to one embodiment. In FIG. 6, a system bus width 602 is illustrated as having 'X' number of bits. The system bus width 602 may be a width of the system bus 104 of FIG. 1 in one embodiment. In FIG. 6, data amounts which are integer multiples of the system bus width are illustrated in 604. In illustration 604, an integer multiple of the system bus width of data is represented because there are '4X' bits shown as data in illustration 604. In contrast, in illustration 606, a non-integer multiple of the system bus width of data is represented because there are less than a whole multiple of 'X' bits represented. Particularly, in illustration 606, a final cell is represented in the illustration 606 as having less than 'X' bits. Therefore, the illustration 606 shows less than an integer multiple of the system bus width amount of total data because it does not have a whole number multiple of 'X' bits. The various embodiments described herein (e.g., as methods and integrated circuits), enable a system bus to communicate data that is an integer multiple of the system bus width (as illustrated in 604) and a non-integer multiple of the system bus width (as illustrated in 606).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the FIFO buffer 100, the data alignment module 102, the system bus 104, the memory device 106, the transceiver module 108, and the components 110A-N of FIGS. 1-5 may be enabled using software and/or using transistors, logic gates, and electrical circuits (e.g., such as a FIFO buffer circuit, a data alignment circuit, a memory device circuit, the transceiver circuit, the component circuitry and other circuits).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a controller comprising:
applying a First In First Out (FIFO) buffer having a buffer width that is wider than that of a system bus width;
determining the buffer width based on a transfer algorithm;
transferring a data between devices coupled to a system bus that permits data amounts that are non-integral multiple of the system bus width; and
transferring the data between devices of the system bus which support any non-aligned system bus address.

2. The method of claim 1:
wherein the transfer algorithm calculates the buffer width of the FIFO buffer by ceiling a logarithmic to base two of a quotient of a division comprising a dividend as the system bus width and a divisor as eight and summing the ceiled value to the system bus width.

3. The method of claim 1:
wherein the FIFO buffer is a data buffer that prevents a loss of the data during a high-speed communication.

4. The method of claim 1:
wherein the system bus is a medium for communicating the data between the devices that are coupled to this bus, and
wherein the system bus width indicates the maximum number of bits transmittable in a cycle.

5. The method of claim 1:
wherein a system bus address specifies a physical location of the memory device from which the controller access the data and communicates with an external component, and
wherein the non-aligned system bus address is the physical location of the memory device that is not integral multiple of the system bus width.

6. The method of claim 3 further comprising:
arranging the data in a byte format in the FIFO buffer;
fetching a data byte into a lower byte position of the FIFO buffer from a lower memory address of a memory device than that of the data byte in higher memory address; and
storing the data byte in the lower byte position to the lower memory address of the memory device than that of the data byte in higher byte position in the FIFO buffer.

7. The method of claim 3:
wherein the buffer width of the FIFO buffer comprises an extra bit, and
wherein the extra bit enables tracking the number of bytes in every entry to the FIFO buffer.

8. The method of claim 4:
wherein the system bus is a high speed Advanced Microcontroller Bus Architecture (AMBA) bus.

9. An integrated circuit comprising:
a controller to manage a data transfer
a FIFO buffer comprising a buffer width wider than a system bus width;
a system bus to provide data transfer that is a non-integral multiple of the system bus width and which begins communicating with a non-aligned system bus address;
a data alignment module coupled between the FIFO buffer and the system bus to read and write data which starts at a non-aligned address location of a memory device; and
a transceiver module coupled between the FIFO buffer of the integrated circuit and an external component.

10. The integrated circuit of claim 9:
wherein the system bus is a medium for the data transfer between devices that are coupled to this bus, and
wherein the system bus width indicates a maximum number of bits transmittable in a cycle.

11. The integrated circuit of claim 9:
wherein the FIFO buffer is a data buffer that prevents a data loss during a high-speed communication.

12. The integrated circuit of claim 9:
wherein the data alignment module drives the logic that initiates a data request on to the system bus in order to read and/or write the data starting with non-aligned address location of the memory device, and
wherein the data alignment module also handles data arrangement of the FIFO buffer.

13. The integrated circuit of claim 9:
wherein the transceiver module communicates to the external component, and is the device that has a transmitter and a receiver which share a common circuitry and/or a single housing, and
wherein the transceiver module also handles the data arrangement of the FIFO buffer.

14. The integrated circuit of claim 10:
wherein the system bus is a high speed AMBA bus.

15. The integrated circuit of claim 10:
wherein a system bus address specifies a physical location of the memory device from which the controller access data and communicates with the external component, and
wherein the non-aligned system bus address is the physical location of the memory device that is not integral multiple of the system bus width.

16. The integrated circuit of claim 12 further comprising:
permitting to access the data in any one of a byte format, a half-word format and a word format through the memory device.

17. The integrated circuit of claim 14:
wherein the system bus is a multiple of byte wide and is capable of handling partial system bus byte request.

18. A method comprising:
applying a FIFO buffer having a buffer width that is wider than that of a system bus width;
determining the buffer width based on a transfer algorithm; and
calculating the buffer width of the FIFO buffer by ceiling a logarithmic to a base two of a quotient of a division comprising a dividend as the system bus width and a divisor as eight and summing the ceiled value to the system bus width.

19. The method of claim 18 further comprising:
transferring a data amount that is non-integral multiple of the system bus width between devices that are coupled to the system bus; and
transferring the data between a component and a memory device on the integrated circuit that starts reading or writing at non-aligned system bus address.

20. The method of claim 18:
wherein the buffer width comprises an extra bit, and
wherein the extra bit enables tracking the number of bytes in every entry to the FIFO buffer.

* * * * *